(12) United States Patent
Xin et al.

(10) Patent No.: US 8,320,254 B2
(45) Date of Patent: Nov. 27, 2012

(54) METHOD AND SYSTEM FOR EFFICIENT MANAGEMENT AND TRANSPORT OF TRAFFIC OVER A NETWORK

(75) Inventors: Chunsheng Xin, Woburn, MA (US); Yinghua Ye, Woburn, MA (US); Sudhir Dixit, Weston, MA (US)

(73) Assignee: Nokia Corporation (FI)

( * ) Notice: Subject to any disclaimer, the term of this patent is extended or adjusted under 35 U.S.C. 154(b) by 1460 days.

(21) Appl. No.: 11/185,890

(22) Filed: Jul. 21, 2005

(65) Prior Publication Data

US 2005/0271038 A1 Dec. 8, 2005

Related U.S. Application Data

(63) Continuation of application No. 09/891,378, filed on Jun. 27, 2001, now abandoned.

(51) Int. Cl.
*H04L 12/28* (2006.01)
*G06F 15/173* (2006.01)

(52) U.S. Cl. ........ 370/237; 370/351; 370/389; 709/235; 709/242

(58) Field of Classification Search .......... 370/230–240, 370/389, 392, 401–410; 709/238–244
See application file for complete search history.

(56) References Cited

U.S. PATENT DOCUMENTS

| | | | | |
|---|---|---|---|---|
| 5,029,164 A * | 7/1991 | Goldstein et al. | ............. | 370/235 |
| 5,414,704 A * | 5/1995 | Spinney | ........................ | 370/389 |
| 5,917,820 A * | 6/1999 | Rekhter | ........................ | 370/392 |
| 6,175,870 B1 * | 1/2001 | Gawlick et al. | ............... | 709/227 |
| 6,341,127 B1 * | 1/2002 | Katsube et al. | ............... | 370/352 |
| 6,363,319 B1 * | 3/2002 | Hsu | ............... | 701/533 |
| 6,512,745 B1 * | 1/2003 | Abe et al. | ........................ | 370/232 |
| 6,563,793 B1 * | 5/2003 | Golden et al. | ............... | 370/236 |
| 6,671,256 B1 * | 12/2003 | Xiong et al. | ................... | 370/230 |
| 6,697,361 B2 * | 2/2004 | Fredette et al. | ............... | 370/389 |
| 6,711,152 B1 * | 3/2004 | Kalmanek et al. | ............ | 370/351 |
| 6,823,395 B1 * | 11/2004 | Adolfsson | ...................... | 709/242 |
| 6,947,669 B2 * | 9/2005 | Wu et al. | ........................ | 398/57 |
| 6,996,065 B2 * | 2/2006 | Kodialam et al. | ............ | 370/238 |
| 7,158,515 B1 * | 1/2007 | Wang et al. | ........................ | 370/392 |
| 7,283,477 B1 * | 10/2007 | Fedyk et al. | ................... | 370/237 |
| 7,319,700 B1 * | 1/2008 | Kompella | ..................... | 370/400 |
| 2001/0032272 A1 * | 10/2001 | Fujita | ........................ | 709/241 |
| 2001/0033574 A1 * | 10/2001 | Enoki et al. | .................... | 370/396 |
| 2001/0037401 A1 * | 11/2001 | Soumiya et al. | ............... | 709/232 |
| 2002/0141345 A1 * | 10/2002 | Szviatovszki et al. | ........ | 370/238 |
| 2002/0163884 A1 * | 11/2002 | Peles et al. | ..................... | 370/229 |

\* cited by examiner

*Primary Examiner* — Habte Mered
(74) *Attorney, Agent, or Firm* — Banner & Witcoff, Ltd.

(57) ABSTRACT

Method and apparatus for efficient management and transport of traffic over a network. The available bandwidth capacity of paths in a network may be stored in a first router. A request may be received at the first router from a network node of a second network for a signaled path through the network to a destination node. Paths may be examined by the first router and the signaled path assigned to a path from the first router to the destination node using an existing path through the network. Further, all traffic from a subnet to a given destination network may be handled by one or more mobile agents at the subnet. One or more mobile agents may be assigned to all or some of the traffic based on current path loading.

22 Claims, 4 Drawing Sheets

METHOD AND SYSTEM FOR EFFICIENT MANAGEMENT AND TRANSPORT OF TRAFFIC OVER A NETWORK

This application is a continuation application of U.S. patent application Ser. No. 09/891,378, filed on Jun. 27, 2001 now abandoned.

BACKGROUND

1. Field of the Invention

This invention relates to network traffic transport, and more specifically to managing and transport of traffic from a source node or subnet over a network to a destination node or subnet.

2. Background Information

The rapid growth of the Internet and new digital services is driving Internet service providers to provide huge bandwidth. The explosive growth of the Internet as well as the proliferation of virtual private networks (VPNs) has resulted in the amount of data traffic worldwide surpassing voice traffic. It is expected that the amount of data traffic will continue to outpace voice traffic for years to come. At the same time, there is strong demand from end users to keep the cost of networking down. These two factors result in a need for network architectures that enable service providers to deliver huge volumes of traffic in a cost effective manner. Internet protocol (IP) over wavelength division multiplexing (WDM) network architecture has proved to be possibly the most cost effective architecture.

Innovations of dense wavelength division multiplexing (DWDM) technology present attractive opportunities to evolve DWDM technology toward an optical networking infrastructure with transport, multiplexing, switching, routing, survivability, bandwidth provisioning, and performance monitoring, possibly supported at the optical layer. The development of fast router technologies has enabled the aggregation of slower data stream traffic into streams suitable for DWDM.

In some IP network structures, IP subnets are interconnected by another network. In a typical IP over WDM network structure, IP subnetworks are interconnected by an intermediate network composed of a switched optical core. Routers in IP subnets which are directly connected with the intermediate network are called border routers. In the case of an optical core, the border routers are directly connected with the optical core network via an optical cross connect (OXC). The border routers are high speed and capable of statistically multiplexing data streams to the capacity that an OXC supports. A border router can generate and terminate the traffic from an optical label switched path (OLSP), i.e., one lightpath. It may not be desirable or necessary for the non-border router to maintain routing information inside the intermediate network, e.g., optical core. The non-border routers in the IP domain may send the LSP setup request to the border routers. Generally, an established lightpath is needed to carry LSPs across the optical core from a source border router to a destination border router.

In determining a path to route traffic from an IP subnet border router through another network to a destination in another IP subnet, two routing issues exist. First, how is a path allocated through the intermediate network, and secondly what routing tasks occur in the routers at the IP subnets. In current networks, the lightpaths are set up to carry the LSPs by the border routers. The LSPs between the same source and destination border router are aggregated onto a directed lightpath or existing lightpaths that provide IP connectivity between these two border routers. However, this method can only accomplish a limited network resource optimization. A network reconfiguration may be applied to optimize the resource utilization, however, such a reconfiguration is inherently static and can only be conducted in a large time scale because the frequent lightpath setup and tear down due to a frequent reconfiguration will result in an undesirable thrash effect for customer traffic and degraded network performance.

FIG. 1a shows a topology diagram of lightpaths in an optical core. Router 22 in network 10 is connected to border router 15. A path <R2, R3> is established via optical cross connects 20 that exist throughout optical core network 12. Non-border router 22 then initiates a request for a path from border router 15 (R1) through network 12 to border router 16. A new path <R1, R3> is established from border router 15 to border router 16 through network 12.

FIG. 1b shows another topology diagram of lightpaths in an optical core. Here, there is an existing path <R1, R2>. Border router 15 initiates a request for a path <R1, R3>. The directed lightpath <R1, R3> is established from border router 15 to border router 16. As can be seen in FIGS. 1a and 1b, these two paths have not shared any resource in network 12.

This current method presents several other problems such as: increases the number of connections across the center of the optical network thereby increasing wavelength resources used; increases the blocking probability of a lightpath setup across the center of the optical core; presents unbalanced load distribution problems; and increases setup delay since new lightpaths are established for each request.

FIG. 2 shows a topology diagram of management of lightpaths through a network to different destinations. Lightpaths between routers are shown as dotted lines. Label switched router (LSR) 70 (border router) at IP subnet 60 has an established path for traffic from IP subnet 60 through network 62 to LSR 78 at IP subnet 66. LSR 70 further has an established path from IP subnet 60 through network 62 to LSR 76 at IP subnet 64. LSR 72 at IP subnet 60 has established paths from IP subnet 60 through network 62 to LSR 78 at IP subnet 66 and from IP subnet 60 through network 62 to LSR 76 at IP subnet 64. Paths from LSR 70 and LSR 72 may enter network 62 at optical cross connect 74 before traveling through other optical cross connects in network 62 to their destination subnets. This is inefficient management of routing considering that there are two separate paths carrying traffic between the same source and destination subnets, i.e., two paths between IP subnets 60 and 66, and two paths between IP subnets 60 and 64.

Currently, three approaches have been used regarding management of routing in the outer IP subnets. In the first approach (multihop), traffic aggregation is done inside the optical core network 62. The traffic may pass several intermediate nodes that process the traffic electronically. This causes a glass ceiling effect because of the limits of electronic processing, e.g., IP or Asynchronous Transfer Mode (ATM) buffering/classification/scheduling. This approach increases equipment costs, plant space requirements, and cannot keep pace with full, multi-wavelength line rates. The virtual topology design, such as how connections among the optical nodes are determined, becomes very critical to providing good performance.

A second approach, also known as an overlay model or client server model, provides a separation of IP and optical domains. IP routers are the client, and the optical network is the server. Conceptually, this model is similar to "circuit-layer" interworkings, e.g., IP-over-ATM incarnations such as MultiProtocol Over Asynchronous Transfer Mode (MPOA).

In this model, scalability is a critical factor and requires $\theta(n^3)$ control message flooding and $\theta(n^2)$ client connections, where $\theta$ represents the magnitude order and n represents the number of border routers. The IP routers submit connection requests to an optical controller and the optical controller allocates the lightpaths to those requests.

In a third approach, known as a peer model, an optical cross connect is treated as a network element, e.g., a label switched router (LSR). General Multiprotocol Label/Lambada switching (GMPLS) is used to support this network model. Lightpaths are requested by LSRs. In order to support full mesh connectivities, e.g., there is at least one direct virtual link (lightpath) between LSRs. The number of connections will be $\theta(n^2)$ where n is the number of LSRs in the network.

All three approaches have inherent problems. Therefore, there is a need for methods and systems for efficient management and transport of traffic over a network that avoids the problems of current systems.

SUMMARY

The present invention is directed to a method for efficient management and transport of traffic over a network that includes: storing the available bandwidth capacity of paths in a network in a first router; receiving a request at the first router from a network node of a second network for a signaled path through the network to a destination node; and examining the paths by the first router and assigning the signaled path to a path from the first router to the destination node. The path may or may not be an existing path to the destination node through the network.

In addition, the present invention is directed to a method for efficient management and transport of traffic over a network that includes: leaking the available bandwidth capacity of paths in a network to a first router by the network; receiving a request at the first router from a network node of a second network for a signaled path through the network to a destination node; and examining all paths by the first router and assigning the signaled path to a path from the first router to the destination node using an existing path to the destination node through the network.

The present invention is further directed to a method for efficient management and transport of traffic over a network that includes: receiving a request at a first router from a network node of a second network for a signaled path through a network to a destination node; requesting information from the network by the first router; receiving the information by the first router, the information including the available bandwidth capacity of paths in a network; and examining paths by the first router using the information and assigning the signaled path to a path from an intermediate node to the destination node using an existing path to the destination node through the network.

Moreover, the present invention is directed to a method for efficient management and transport of traffic over a network that includes: receiving a request at a first router from a network node of a second network for a signaled path through a network to a destination node; requesting information from the network by the first router; receiving the information by the first router, where the information includes the available bandwidth capacity of paths in a network and a list of routers close to the destination node; and examining paths by the first router using the information and assigning the signaled path to a path from an intermediate node to the destination node The present invention is also directed to a method for efficient management and transport of traffic over a network comprising: monitoring traffic between the second network through the first network to one or more remote network by a mobile agent candidate at the second network; and assigning traffic between the second network through the first network to each remote network by the mobile agent to a different one of one or more routers, where new traffic from the second network to one remote network may be assigned to the one router assigned to that one remote network.

Further, the present invention is directed to a router that includes a database, a decision module, a mapping and aggregation module, an LIB agent module, a routing and wavelength assignment module, a traffic monitoring module, and a mobile agent selection module. The database stores information regarding the available bandwidth capacity of paths in a network. The decision module receives a request for a path to route traffic through the network and uses the information to return a sequence of paths in the network to handle the traffic. The LIB agent module shares and collects the information from other routers and performs signaling. The routing and wavelength assignment module computes and selects paths and assigns wavelengths. The mapping and aggregation module aggregates the traffic to existing paths that have enough bandwidth to carry the traffic. The traffic monitoring module monitors the traffic load initiating from the subnet. The mobile agent selection module uses the results of the monitoring to choose or de-select a router to manage the traffic through the sequence of paths.

The present invention is further directed to a system for efficient management and transport of traffic that includes a first network having a source node, a second network having a plurality of paths through the second network, a third network having a destination node, and a router operably connected to the first network and the second network. The router receives a request from the source node for a path through the second network to route traffic from the first network to the destination node at the third network. The router routes the traffic using an existing path to the destination node through the second network. New traffic from the first network to the destination node at the third network may be assigned to a router assigned to handle traffic to the destination node at the third network.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and systems for efficient management and transport of traffic over a network where existing paths through a network are used to aggregate new traffic. This maximizes the use of existing paths while maintaining bandwidth requirements for each individual path. Moreover, a mobile agent may be used to manage traffic destined to other subnets over a network by assigning to border routers all or part of the traffic between the source network of the border router and that destination network. To illustrate the present invention, IP subnets, which may or may not contain the border routers, will be used. Moreover, an optical core network, (which may or may not contain border routers), where traffic is passed through from a source border router to a destination border router in another network, will also be used. However, the present invention is not limited to IP subnets or optical core networks but any networks (e.g., Asynchronous Transfer Mode (ATM) networks, frame-relay networks, etc.) are within the spirit and scope of the present invention.

Figure 3:
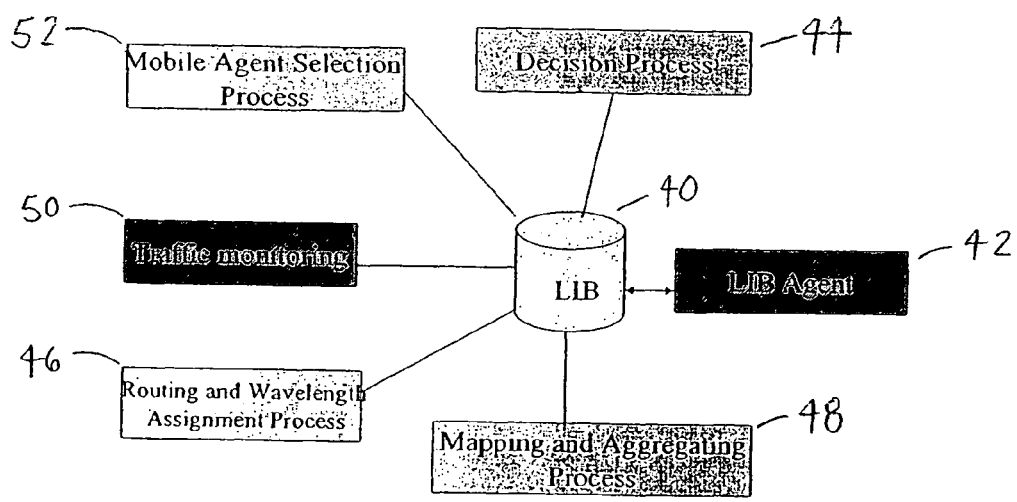
FIG. 3 is a block diagram of a border router according to an example embodiment of the present invention.

FIG. 3 shows a block diagram of a border router according to an example embodiment of the present invention. A lightpath information base (LIB) 40 stores the available bandwidth capacity of paths over a network, e.g., optical core. The bandwidth of locally originating paths may be provided by a local border router. Bandwidth information of all other paths (originating in other border routers) may be obtained via an LIB agent 42. Border routers communicate with each other via LIB agent 42 to collect path bandwidth information into LIB 40. In a small network, a centralized approach may be used to synchronize the LIBs in all border routers. In this case, each LIB agent may communicate with a central controller. In a large network, a distributed approach may be desirable to distribute the bandwidth information.

LIB 40 may be implemented using a fast look up table, such as a hash table or a search tree. LIB agent 42 may be implemented by extending an interior gateway protocol (IGP) used in the routing process. For example, OSPF, a lightpath link state advertisement (LSA) may be used to carry the lightpath bandwidth information. When the available bandwidth of a lightpath changes or a new lightpath is established, the lightpath LSA may be broadcasted immediately or piggybacked on the next routing information update. Moreover, an LIB agent may be implemented using a simple TCP-based message processing application. Some message types may need to be defined and an OSPF-like flooding mechanism may need to be used. The IGP control channels among border routers may be utilized as the communication channels between LIB agents. In interior gateway protocol such as OSPF, some sort of IP connectivity may be required for the IGP to work.

Decision process 44 may be a function that takes a LSP request and uses the information in LIB 40 to determine and return a lightpath sequence. An LSP request may contain the bandwidth requirement and two border routers (i.e., source border router and destination) between which the traffic crosses the optical core. In a lightpath sequence returned by decision process 44, there may be some lightpaths that do not exist and need to be set up. Decision process 44 examines all lightpaths and tries to aggregate the LSP to existing lightpaths and, if necessary, establish new lightpaths which require less resources compared with establishing a direct lightpath for the LSP. The aggregation may shift the load to the edge from the center in the optical network and improve the network resource utilization. If such an aggregation cannot be found, decision process 44 outputs a lightpath sequence which contains one lightpath to be established between the source and destination border routers of the LSP.

LIB agent 42 is responsible for signaling and information collecting. Signaling functions include connection set up, tear down, query, abort, and failure notification, etc. In addition, LIB agent can also request a remote node to establish a lightpath from that remote node to another node. RSVP and CR-LDP may be used for this purpose. An LIB agent is also responsible for resource discovery and information exchange. Each LIB agent may exchange path information with other border routers by sending the locally originating path information and receiving path information originating at other border routers. Therefore, through LIB agent 42, each individual border router maintains bandwidth information of all or some paths over the optical core in its LIB 40.

Routing and wavelength assignment process 46 is a component that computes and selects paths and assigns wavelengths. Routing and wavelength assignment processes optical LSP (lightpath) requests, and handles the wavelength allocation in the optical network. There are many RWA algorithms available for this purpose, e.g., first-fit, leased-cost, maxed-sum, etc. There are two scenarios in terms of routing and signaling of lightpaths. In scenario 1, each border router has the full connectivity information of the optical core in the border routers. The border router computes the routing path across the optical core and initiates the signaling procedure to the optical cross connects along the routing path to set up a lightpath. In this scenario, the IP-centric routing and signaling protocols with appropriate optical extension may be used. For example, a link state routing protocol such as open shortest path first (OSPF) or intermediate system-intermediate system (IS-IS), may be used for the lightpath routing, and reservation protocol (RSVP)-TE or CR-LDP may be used for the lightpath establishment.

In scenario two, the optical core may appear as a cloud to the IP domain. Each border router may have the reachability information of other border routers and may request the optical core to set up a lightpath to a destination border router through user network interface (UNI) signaling. The optical core computes the routing path and initiates the signaling procedure. In this scenario, from the border routers point of view, the routing and signaling is as simple as only requesting a lightpath via UNI. The address or reachability information of other border routers is obtained through UNI query or automatic leaking by a protocol like border gateway protocol (BGP).

Mapping and aggregation process 48 sets up a LSP over a lightpath sequence in which each lightpath has been established and has enough available bandwidth to carry the LSP. The mapping and aggregation process maps IP LSPs which may have the same destination subnets over a optical LSP. It also updates the bandwidth availability information on optical LSP which carries the data traffic. The utilization of optical LSPs may be updated and exchanged by LIB agents. Every intermediate border router (i.e., termination border router of each lightpath in the lightpath sequence) updates its routing and forwarding table to store the LSP information. The pertinent lightpath information in LIB 40 of each intermediate border router may then updated and exchanged by each LIB agent 42 to all other border routers.

Figure 1A:
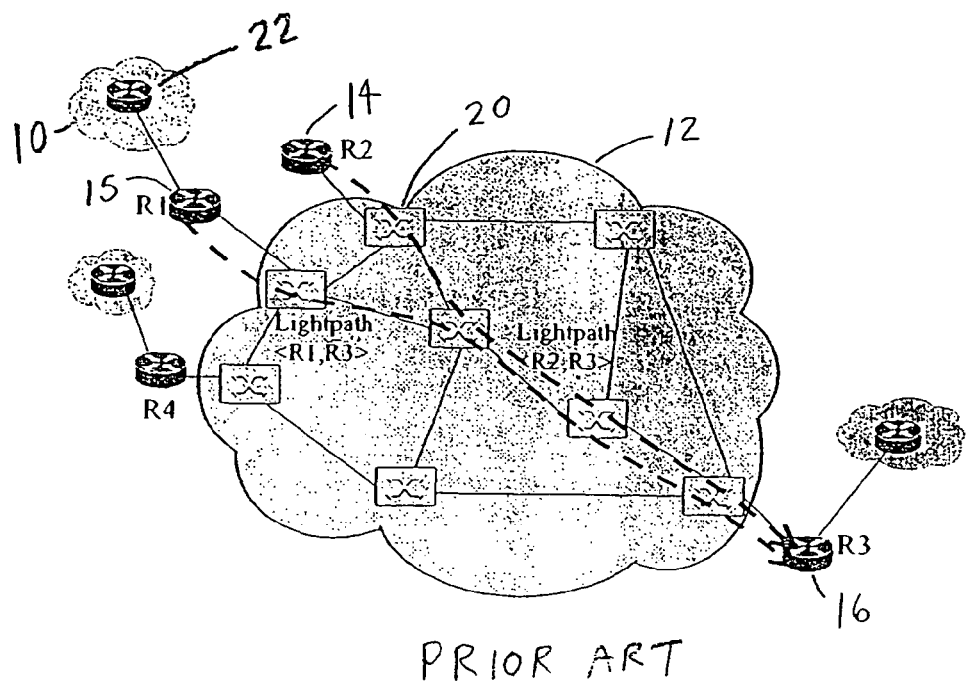
FIG. 1a is a topology diagram of lightpaths in an optical core.
Figure 1B:
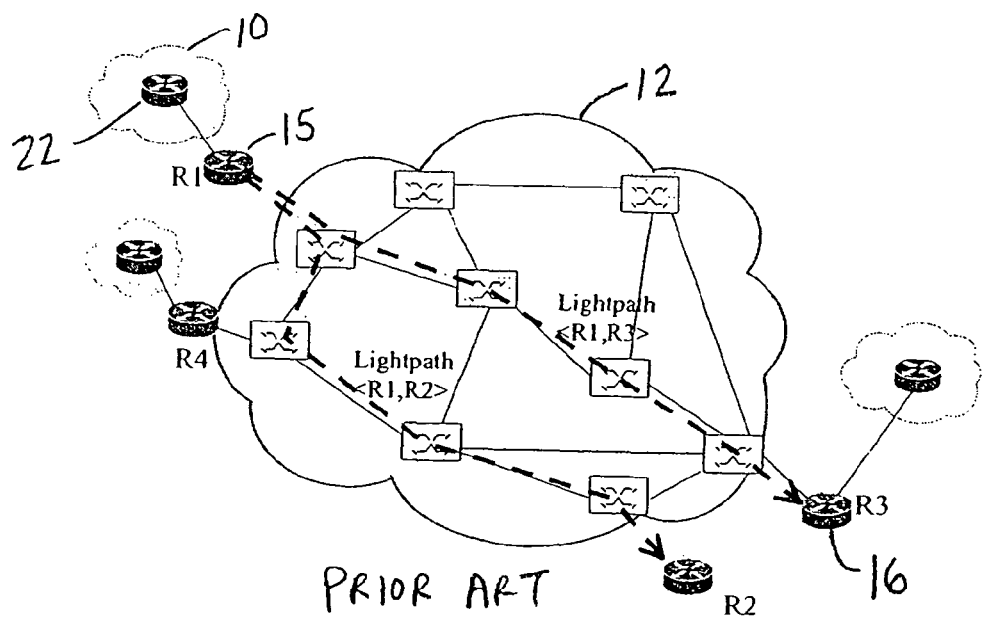
FIG. 1b is another topology diagram of lightpaths in an optical core.
Figure 2:
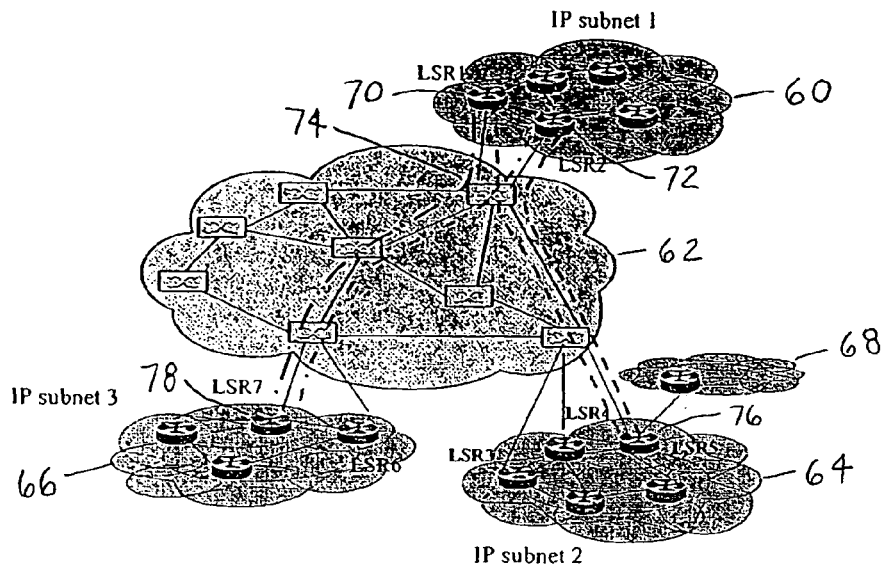
FIG. 2 is a topology diagram of management of lightpaths through a network to different destinations.
Figure 4A:
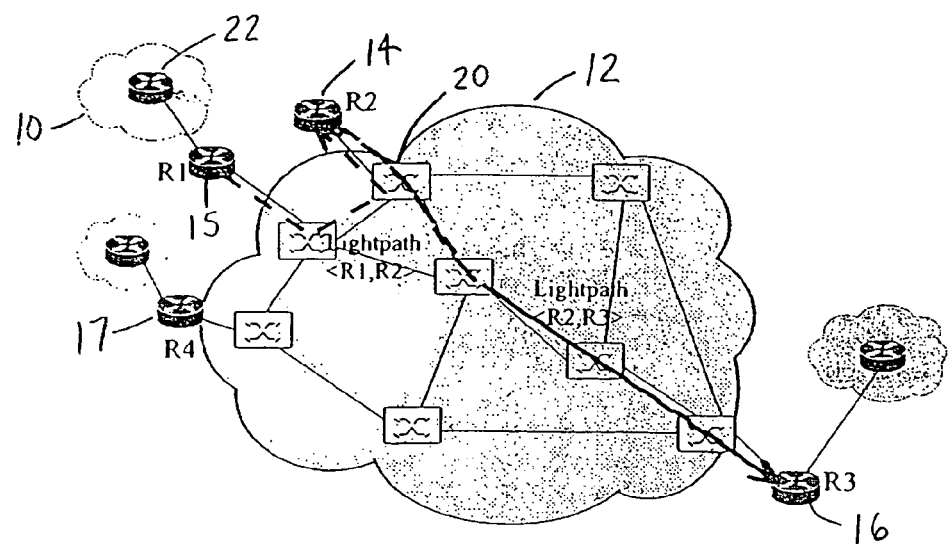
FIGS. 4a and 4b are topology diagrams of transport of traffic according to example embodiments of the present invention.
Figure 4B:
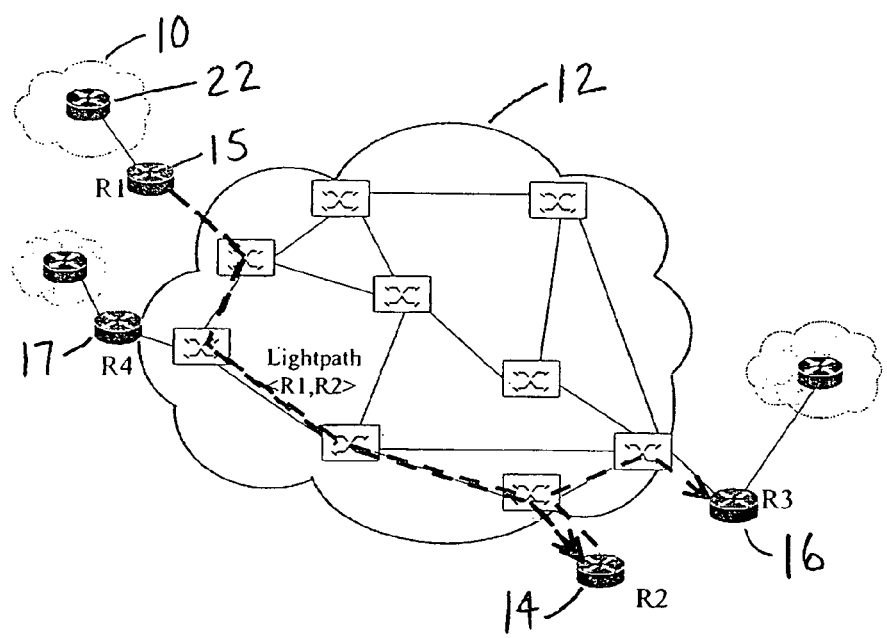

FIGS. 4a and 4b show topology diagrams of transport of traffic according to example embodiments of the present invention. This figure is identical to FIG. 1 except that FIG. 4a shows the routing path from border router 15 to destination border router 16 according to the present invention. Border router 15 receives a request for a path through network 12 from non-border router 22 at IP subnet 10. Border router 15, using the capacity and bandwidth information, determines that a path already exists between border router 14 and destination border router 16. Border router 15, therefore, creates a path from border 15 through optical cross connects to border router 14 and then utilizes the existing path from border router 14 to border router 16. In this embodiment of the present invention, the border routers may be part of the source network (e.g., 10), the network that the path traverses through (e.g., 12), or a third network and still be within the spirit and scope of the present invention.

Therefore, according to the present invention, lightpath bandwidth information may be exchanged between border routers through an LIB agent. Each border router also may contain information related to a list of border routers that are close to it in the routing distance in the optical core. This list is named a collaboration group (CRG). For example, looking at FIG. 4a, border routers 14 and 17 are both in the CRG of border router 15 since border router 15 only needs to go one hop in the optical core to set up a lightpath to either border router 14 or border router 17. CRG information may be obtained through different methodologies. In a peer model where the routing information inside the optical core is completely broadcasted to the border routers, each border router may compute its CRG via the topology database. In an augmented model, where the routing information inside the optical core is partially leaked to the border routers (typically via a border gateway protocol), the reachability together with routing distance of other border routers may need to leaked to each border router through the optical core. Every border router may then compute its CRG based on such information. In an overlay model, where the routing information of the optical core may be completely hidden from the border routers and the border router only may request lightpath services through a UNI, the UNI may need to be extended to provide not only the address of other border routers but also the routing distance to those border routers.

In decision process 44, each border router may maintain a CRG. When the decision process is invoked, the source border router attempts to aggregate the LSP onto an existing lightpath between the source and destination border routers. If this is not possible, the source border router examines its own CRG to find a border router, namely relay router, that has an existing lightpath to the destination border router that has enough available bandwidth to carry the requested LSP. If a relay router is found, then the source border router makes a decision to utilize an existing lightpath and/or a new lightpath from itself to the relay router. A lightpath is composed by concatenating the lightpath from the source border router to the relay router (which may need to be set up), and the existing lightpath from the relay router to the destination border router. In addition, if a relay router cannot be found from the source border router CRG, the source border router examines the destination border routers CRG, via signaling, and attempts to find a relay router to which the source border router has an existing lightpath. If a relay router is found, the source border router requests the relay router to setup a lightpath from the relay router to the destination border router as shown in FIG. 4b. If a relay router cannot be found, a lightpath sequence may be composed of setting up only a direct lightpath between the source and destination border routers.

Two routing and signaling scenarios will be used to illustrate the present invention. The first scenario corresponds to the peer network model, and the second scenario corresponds to the augmented and overlay models. In the first scenario, any IP-centric interior gateway protocols (IGP) and signaling protocols with appropriate optical extensions may be used. In terms of the interoperability and cost considerations, IETF standard IGPs, e.g., OSPF or IS-IS, and signaling protocols, e.g., RSVP-TE or CR-LDP, may be preferred.

In the second scenario, each border router may have the reachability information of other border routers and can request the optical core to set up a lightpath to a destination border router through the user network interface (UNI) signaling. Thus, in terms of routing and signaling a lightpath from a border router, only requesting a lightpath via UNI is needed. In the second scenario, two separate routing instances may have to be established. One instance may be used inside the optical core for lightpath routing. Another instance may be used among the border routers. In order to establish the routing instance among the border routers, an overlay topology may be established across the optical core and used as the control channels of the border routers routing instance. However, in the first scenario, only a single routing instance is established over both the border routers and the optical cross connects in the optical core, and the control channels may be a dedicated wavelength in a link between two nodes (e.g., a border router or optical cross connect (OXC)). Therefore, in both scenarios, the LIB agents may use the IGP control channels of the border routers to communicate with each other.

Mapping and aggregation process 48 may be implemented by the label mapping and stacking mechanism in multiprotocol label switching (MPLS). The LSPs originating from non-border routers may be stacked onto an OLSP on the optical core. The relay router pops the LSPs from OLSP originating at the source border router and pushes onto another OLSP terminating at the destination border router. When the LSP set up request arrives, the decision process and routing and signaling may be invoked to establish the lightpath sequence which may be used to aggregate the LSP by the mapping and aggregation process. Since the lightpath sequence is fully established (after routing and signaling process), each lightpath in the lightpath sequence may be taken as a virtual hop, and the whole lightpath sequence may be taken as a strict exclusive subroute and inserted into the explicit route of the LSP request with the subroute sitting between the source and destination border routers. Then, the normal MPLS LSP signaling can continue as in a traditional IP network. During this time, the border routers communicate with each other using the established lightpaths since they are seen as virtually to provide IP connectivity. Border routers may not need LIB agents to send or receive information to perform the normal MPLS LSP signaling as in the collection of lightpath bandwidth information for LIB 40.

In another embodiment of the present invention border routers may be candidates for taking the role of agents. Traffic monitoring process 50 and mobile agents selection process 52 may be included in border routers. An agent delivers traffic to certain destinations. Once an agent is chosen, LSPs (possibly from non-border routers) going to the certain destination network (e.g., IP subnet) go through the agent node. After traffic aggregation, an agent router maps these LSPs into optical LSPs if there are existing optical LSPs between the source network and the destination network. Otherwise, the agent router may be responsible to set up connections (that are needed but don't exist) over the optical network. Routing and wavelength assignment process 46 and decision process 44 allocate the corresponding route and wavelength for optical LSPs.

Mobile agent selection process 52 chooses an agent from border routers according to the results from traffic monitoring process 50. If the traffic load is heavy, the number of agents may be increased and, conversely, if traffic is light, there may be no dedicated agent needed. Mobile agent selection process 52 may flexibly select any border router as an agent. Mobile agent process 52 may use a centralized approach, where one of the border routers decides who is agent for each of the destination networks. A distributed approach may also be used where an election method may be adopted according to traffic demands and LIB information. Since the agent is "mobile", once a border router failure happens, other border routers may quickly take the role of the failed border router (i.e., agent) thus reliability is increased.

Figure 5:
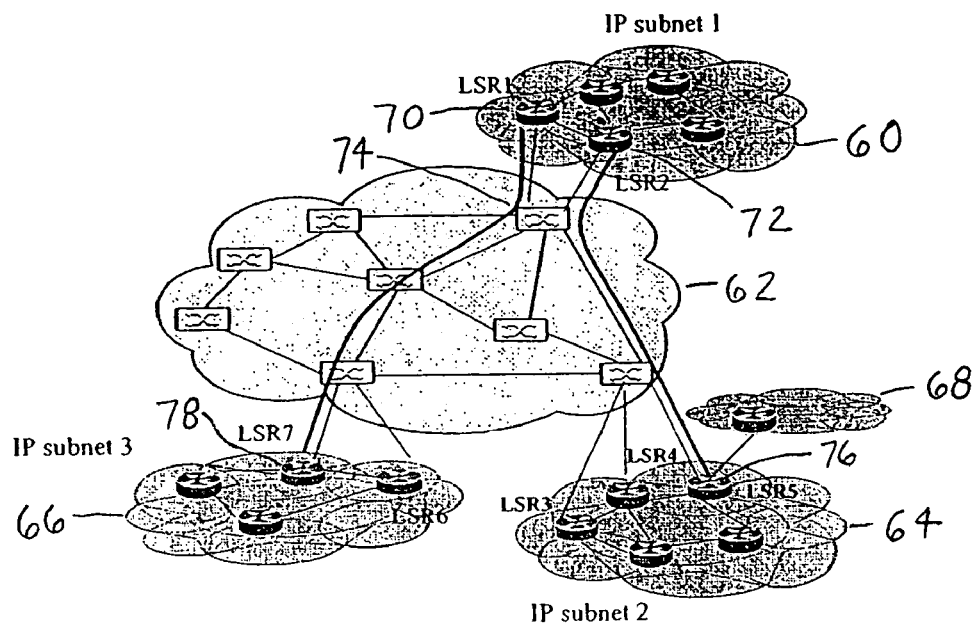
FIG. 5 is a topology diagram of traffic management using a mobile agent according to an example embodiment of the present invention.

FIG. 5 shows a topology diagram of traffic management using a mobile agent according to an example embodiment of the present invention. Border routers 70 and 72 of source network 60 (IP subnet) each handle dedicated traffic between IP subnet 60 and IP subnets 66 and 64 respectively. Border router 70 handles the routing of traffic from IP subnet 60 through network 62 to destination border router 78 at IP subnet 66. Similarly, border router 72 handles all traffic between source subnet 60 and destination border router 76 at IP subnet 64. As noted previously, although network 62 is shown as an optical core network for illustration, network 62 may be any network and still be within the spirit and scope of the present invention, for example, an ATM, frame relay, X.25, IP, etc.

In FIG. 5, IP subnet 60 selects border router 70 as an agent to connect with IP subnet 66. Border router 72 is also selected by IP subnet 60 as the agent to set up connections with and communicate to IP subnet 64. Thus, as noted previously, border routers 70 and 72 handle all the traffic outgoing and incoming from subnet 66 and subnet 64, respectively. Therefore, after traffic aggregation at each agent, the number of connections through network 62 can be greatly reduced.

Figure 6:
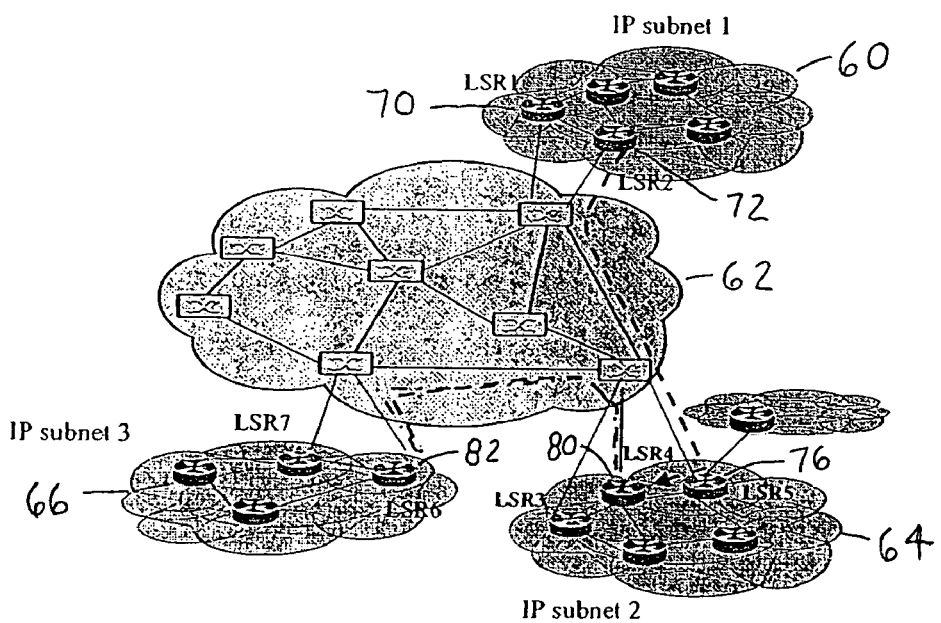
FIG. 6 is a topology diagram of traffic management using a mobile agent where traffic volume is light according to an example embodiment of the present invention.

FIG. 6 shows a topology diagram of traffic management using a mobile agent where traffic volume is light according to an example embodiment of the present invention. If traffic volume is light between a source network and a destination network, a direct connection between the two networks may not be necessary, and the approach applied for the border routers can be adopted. For example, assume subnet 60 has a LSP request to subnet 66, demanding 50% or less bandwidth of a lightpath capacity. IP subnet 60 is aware that a connection exists between border router 72 of IP subnet 60 and IP subnet 64 which is a neighbor of IP subnet 66. IP subnet 60 also knows that this connection between IP subnet 60 and IP subnet 64 is under utilized (i.e., 50% or less). Border router 70 may currently handle traffic to destination network 66. Subnet 60 may then deselect border router 70 and forward the traffic from border router 70 (destined to subnet 66) to border router 72. Border router 72 may then set up a lightpath to IP subnet 66 and aggregate the traffic further from border router 76 at IP subnet 64 to border router 80 at IP subnet 64. The traffic then travels from IP subnet 64, border router 80 to IP subnet 66 through border router 82 at IP subnet 66. Therefore, the traffic is pushed away from the center of network 62 to the edge, therefore, allowing more connections inside network 62 to be accommodated.

If the traffic is heavy between a source network and a destination network, there may be more than one border router at the source network selected as an agent for the destination network. Depending on LSP demands, the agent for a destination network may be moved among the border routers. As mentioned previously, the mobile agent process may be accomplished using a centralized approach where one border router decides who is agent for other subnets, or a distributed approach where an election method may be adopted depending on the traffic demands and LIB information. The traffic monitoring process determines whether a load is heavy or light. A traffic monitoring process in border routers monitor the IP traffic in each queue for different destination network traffic. For each destination network there may be an associated queue corresponding to it. When traffic volume achieves certain levels, a new agent may be needed to be assigned for that traffic destination network. When the traffic drops below a certain level, the role of one or more border routers as an agent may be eliminated.

Therefore, as mentioned previously, according to the present invention mobile agent selection process may be implemented by using a centralized approach or distributed approach. In the centralized approach, one of the border routers is designated as a controller to collect the traffic information from all border routers, and to compute how many agents are needed for specific network connections and where the agents should be put. Once the decision is made, the controller may broadcast the decision to the whole subnet. The traffic which has the same subnet destination may be groomed and mapped into the same optical connection. In a distributed approach, every border router exchanges the traffic information (such as queue length and existing optical LSPs). Every border router works independently to decide whether it will be the agent or whether other border routers need to work as co-agents for a subnet connection. Once the mobile agent process is completed, information will be exchanged, including link state protocols (IS-IS, or OSPF). After both approaches, a constraint based routing may take a role as a traffic engineering to select paths for IP LSPs.

Methods and systems according to the present invention have several advantages. Specifically, network resources are saved, load balancing may be performed, efficient support of small bandwidth requirements of LSPs occurs, an alternative if a direct lightpath cannot be established between two border routers is provided, elegant integration of IP layered granularity with optical layered granularity is provided, routing of traffic between border routers followed by aggregation takes advantage of the lightpath loading of the optical core at the edge and heavy loading in the center of the optical core, effectively relieves the wavelength exhausting in optical core network, improves optical network availability, enhances network survivability, improves network scalability, simplifies the optical network virtual topology design, simplifies control and signaling mechanisms in optical networks, dynamically applies IP aware traffic control at the optical edge and traffic aggregation in border routers (LSRs), provides an alternative approach if the direct connection between two networks doesn't exist, and balances traffic load in IP over wavelength division multiplexing (WDM) network.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method comprising:
   storing data regarding available bandwidth capacity of paths in a first network at a first router;
   receiving a request at the first router from a network node of a second network for a signaled path through the first network to a destination node;
   selecting, by the first router, a path from the first router to the destination node using the data regarding available bandwidth capacity of paths in the first network, the selecting including examining a plurality of paths in the first network and determining the selected path based on the examined plurality of paths;
   assigning the signaled path to the selected path; and
   exchanging the data regarding available bandwidth capacity of paths in the first network with other routers in the first network for storage at each router.

2. The method according to claim 1, wherein the request contains a bandwidth requirement for the signaled path, and wherein the bandwidth requirement is met by the assigned signaled path.

3. The method according to claim 1, wherein the first network is a fiber optic network and each path is a lightpath.

4. The method according to claim 3, wherein the second network is an Internet Protocol (IP) network.

5. The method according to claim 1, wherein storing the data regarding available bandwidth capacity of paths in the first network at the first router includes storing the data in a database at the first router.

6. The method according to claim 5, wherein the database comprises a lookup table.

7. The method according to claim 6, wherein the lookup table comprises one of a hash table and a search tree.

8. The method according to claim 1, wherein the data regarding available bandwidth capacity of the paths in the first network are exchanged by lightpath information base (LIB) agents in each router.

9. The method according to claim 1, wherein the destination node is a router.

10. The method according to claim 1, wherein the assigned path comprises a label switched path (LSP).

11. The method according to claim 1, further comprising determining a list of routers that are close in routing distance to the first router based on a topology of the first network and wherein the examined plurality of paths includes only paths to routers of the list of routers.

12. The method according to claim 1, wherein an existing path comprises a path from a second router to the destination node through the first network, and wherein the assigned signaled path comprises a path from the first router to the second router and the existing path from the second router to the destination node.

13. The method according to claim 12, wherein the first router and second router are border routers of one of the first network and the second network.

14. The method according to claim 12, wherein the second router is close to the first router in distance.

15. The method according to claim 12, further comprising sending the data regarding available bandwidth capacity of paths in the first network to the first router.

16. The method according to claim 1, wherein the assigned signaled path comprises an existing path from the first router to a second router and a path from the second router to the destination node.

17. The method according to claim 16, wherein the second router is close to the destination node in distance.

18. A method comprising:
   leaking available bandwidth capacity of paths in a first network to a first router of the first network;
   receiving a request at the first router from a network node of a second network for a signaled path through the first network to a destination node;
   selecting, by the first router, a path from the first router to the destination node using the available bandwidth capacity of paths in the first network, the selecting including examining a plurality of paths in the first network and determining the selected path based on the examined plurality of paths;
   assigning the signaled path to the selected path; and
   exchanging data regarding the available bandwidth capacity of paths in the first network with other routers in the first network for storage at each router.

19. A method comprising:
   receiving a request at a first router from a network node of a second network for a signaled path through a first network to a destination node;
   requesting information from the first network by the first router;
   receiving the information by the first router, the information comprising available bandwidth capacity of paths in the first network and a list of routers close to the destination node;
   selecting, by the first router, a path from an intermediate node to the destination node using the received information, the selecting including examining a plurality of paths in the first network and determining the selected path based on the examined plurality of paths;
   assigning the signaled path to the selected path; and exchanging data regarding the available bandwidth capacity of paths in the first network with other routers in the first network for storage at each router.

20. An apparatus comprising:

circuitry; and a storage device configured to store software instructions that, when executed, are configured to cause the apparatus to:

store data regarding available bandwidth capacity of paths in a first network;

receive a request from a network node of a second network for a signaled path through the first network to a destination node;

select a path from the apparatus to the destination node using the data regarding available bandwidth capacity of paths in the first network, the selecting including examining a plurality of paths in the first network and determining the selected path based on the examined plurality of paths;

assign the signaled path to the selected path; and exchange the data regarding available bandwidth capacity of paths in the first network with routers in the first network for storage at each router.

21. The apparatus according to claim 20, wherein storing the data regarding available bandwidth capacity of paths in the first network includes storing the data in a database.

22. The apparatus according to claim 20, wherein the software instructions are further configured to, when executed, cause the apparatus to determine a list of routers that are close in routing distance based on a topology of the first network and wherein the examined plurality of paths includes only paths to routers of the list of routers.

* * * * *

UNITED STATES PATENT AND TRADEMARK OFFICE
CERTIFICATE OF CORRECTION

PATENT NO. : 8,320,254 B2
APPLICATION NO. : 11/185890
DATED : November 27, 2012
INVENTOR(S) : Chunsheng Xin et al.

Page 1 of 1

It is certified that error appears in the above-identified patent and that said Letters Patent is hereby corrected as shown below:

Column 12, Claim 8, Line 2:
Please delete "of the paths" and replace with --of paths--

Signed and Sealed this
Second Day of April, 2013

Teresa Stanek Rea
*Acting Director of the United States Patent and Trademark Office*